Sept. 10, 1957  E. J. MALLOY  2,805,847
ACCESSORY IMPACT MECHANISM FOR TRACTORS
Filed June 28, 1955  3 Sheets-Sheet 1
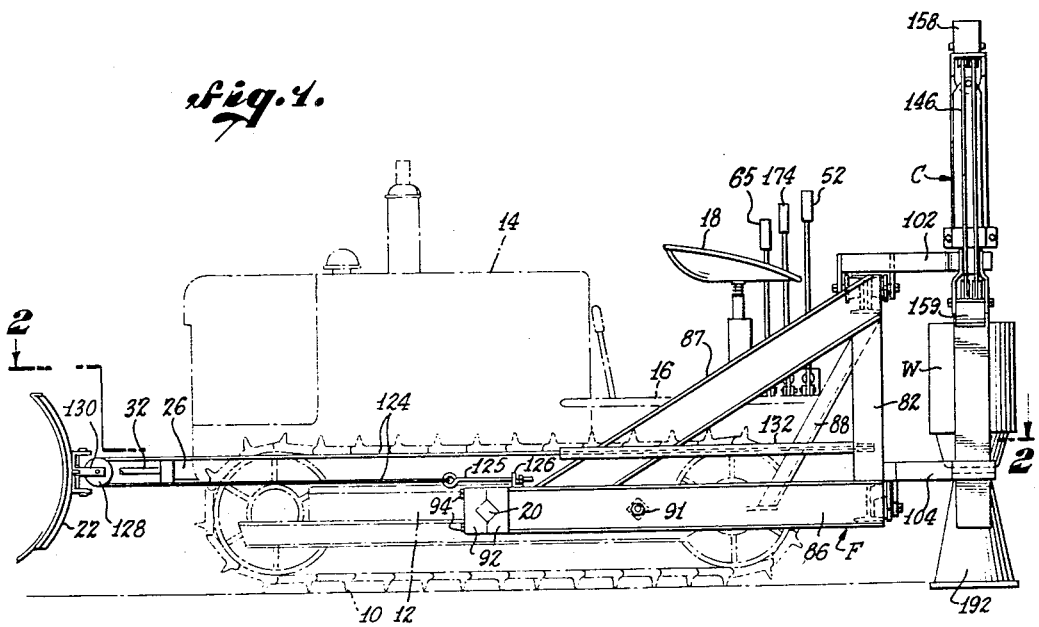
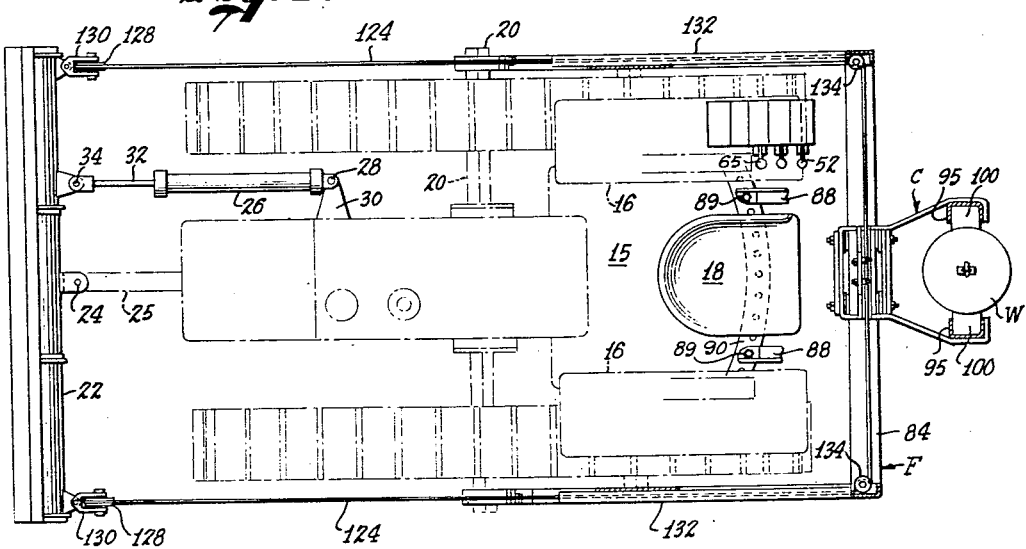
EMMETT J. MALLOY,
INVENTOR.
BY George C. T. Smyth
ATTORNEY.

Sept. 10, 1957     E. J. MALLOY     2,805,847
ACCESSORY IMPACT MECHANISM FOR TRACTORS
Filed June 28, 1955     3 Sheets-Sheet 2
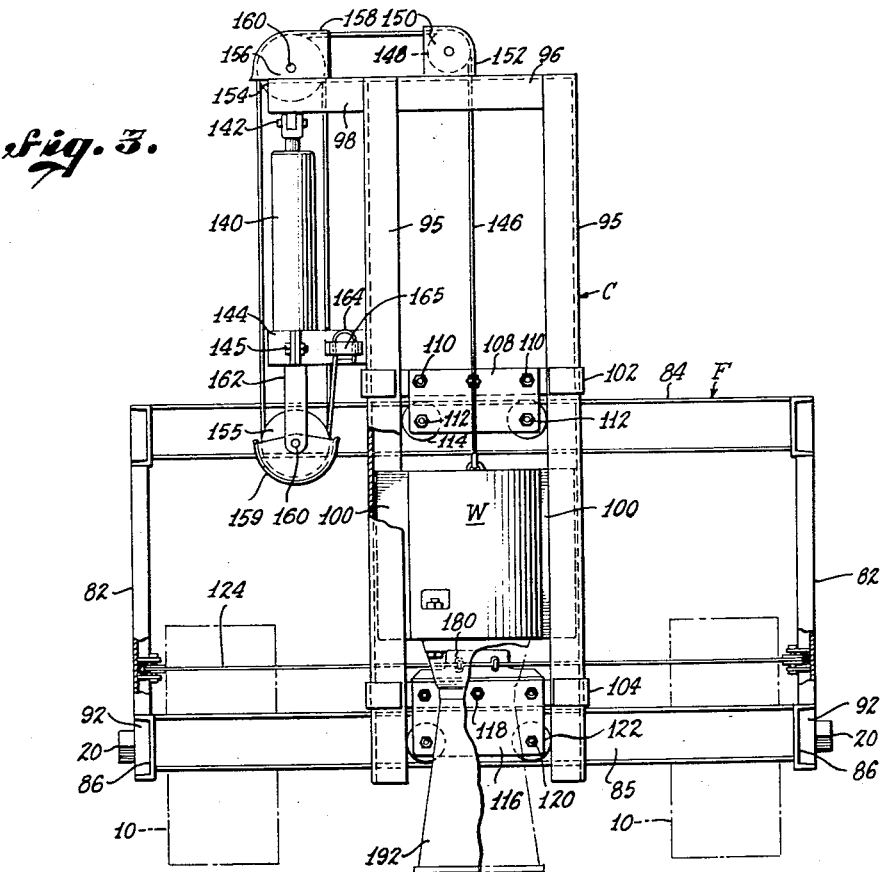
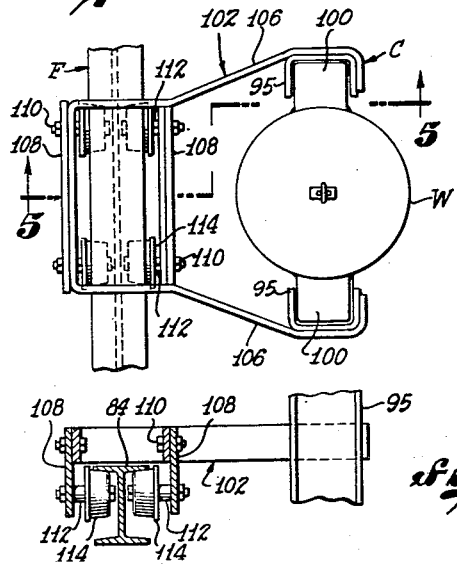
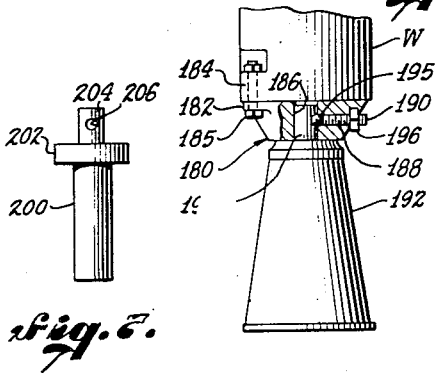
EMMETT J. MALLOY, INVENTOR.
BY George J. Smyth
ATTORNEY.

Sept. 10, 1957  E. J. MALLOY  2,805,847
ACCESSORY IMPACT MECHANISM FOR TRACTORS
Filed June 28, 1955  3 Sheets-Sheet 3

EMMETT J. MALLOY,
INVENTOR.

BY George T. Smyth
ATTORNEY.

United States Patent Office 2,805,847
Patented Sept. 10, 1957

2,805,847
ACCESSORY IMPACT MECHANISM FOR TRACTORS

Emmett James Malloy, Inglewood, Calif.

Application June 28, 1955, Serial No. 518,515

10 Claims. (Cl. 262—15)

This invention relates to an accessory mechanism for attachment to a conventional tractor to increase the usefulness of the tractor, the preferred practice of the invention being directed to an accessory mechanism for operating an impact tool.

A tractor of a well known type is commonly equipped with a forward pusher blade or so-called bulldozer blade for moving earth and is used commercially for clearing and grading land. Such a tractor has a certain packing or tamping effect on loose earth by virtue of its weight but this tamping effect is limited because the tractor treads provide relatively large traction areas with correspondingly low loading per unit area. Consequently, where effective tamping of loose earth, gravel or the like is required, additional equipment other than the tractor must be used. In many instances, moreover, a clearing or grading job includes the task of breaking up and removing a ground cover of concrete or asphalt. Here again a conventional tractor is incapable of the task and additional equipment must be used to carry out the job.

The present invention provides an accessory which may be quickly and conveniently mounted on a conventional tractor to give the tractor additional functions. The accessory provides an auxiliary tool in the form of a heavy weight or impact means and includes mechanism to raise and drop this impact means. The downward force created by dropping the impact weight may be used for such purposes as tamping loose material under the tractor as well as for such purposes as breaking up concrete and asphalt.

The accessory provided by the preferred embodiment of the invention includes an auxiliary frame which may be mounted, for example, on the rear of the tractor to support the impact weight. Since the impact means exerts impact forces on only a narrow area, the width of which is only a fraction of the width of the tractor, it is desirable to mount the impact means on the auxiliary frame in such manner that the impact means may be moved thereon transversely of the tractor. Such an arrangement makes it unnecessary to move the tractor laterally in order to exert downward impact force over the full width of the path of the tractor. Thus, with the tractor stationary, the impact means may be operated in a cycle of impact operations with lateral shift of the impact means after each operation to cover the full width of the tractor, and then the tractor may be advanced longitudinally for repetition of the cycle.

A feature of the invention in this regard is the concept of using the conventional hydraulic control system of the tractor for causing lateral shift of the impact means relative to the auxiliary frame on which it is mounted. In the present embodiment of the invention, for example, the tractor on which the accessory is mounted has a bulldozer blade at its front end and this blade is adjustable in position relative to the tractor by means of the hydraulic control system of the tractor.

The preferred practice of the invention provides for connecting the impact means with the pusher blade in such manner that change in position of the pusher blade relative to the tractor by remote control causes corresponding transverse shift of the impact means across the tractor. In this instance, the hydraulic control system of the tractor varies the angle of the bulldozer blade relative to the tractor by remote control and the impact means shifts in response to the change in angle of the blade.

In the preferred practice of the invention, the auxiliary frame provides a track extending transversely of the tractor and the impact means is mounted on a carriage that rides on the track. Mechanism for raising and dropping the impact means is mounted on the carriage for movement therewith. This carriage is operatively connected to the bulldozer blade for shift along the track in response to change in the relative angle of the blade.

The invention is further characterized by the concept of providing means on the carriage for energization by the conventional hydraulic control system of the tractor to raise the impact means. The weight-raising means typically comprises a hydraulic actuator and a remote control valve that is connected both to the hydraulic actuator and to the hydraulic system of the tractor.

A feature of the preferred practice of the invention is the concept of connecting the impact weight to the carriage by means of a looped cable with the hydraulic actuator adapted for elongation of the cable loop. In this manner the impact weight is raised by a relatively short power thrust on the part of the actuator.

A further feature of the invention is the concept of detachably mounting an impact tool on the impact weight. This arrangement makes it possible to employ a plurality of impact tools interchangeably. The accessory may be provided with a set of impact tools including, for example, a blunt-faced tamping tool and a pointed or chisel-like cutting tool for penetrating asphalt, concrete and the like.

The various features and advantages of the invention will be apparent in the following detailed description in conjunction with the accompanying drawings. In the drawings which are to be regarded as merely illustrative:

Figure 1 is a side elevation of a typical tractor having the presently preferred embodiments of the invention mounted thereon;

Figure 2 is a longitudinal section taken as indicated by the broken line 2—2 of Figure 1;

Figure 3 is a rear elevation of the accessory on the tractor with portions broken away;

Figure 4 is a plan view of the carriage mounted on the auxiliary frame;

Figure 5 is a fragmentary sectional view of the carriage taken as indicated by the broken line 5—5 of Figure 4;

Figure 6 is a front elevation, partly broken away, showing the lower portion of the impact weight with a tamping tool detachably mounted thereon;

Figure 7 is a front elevation of a chisel-like tool that may be used interchangeably with the tamping tool.

Figure 8:
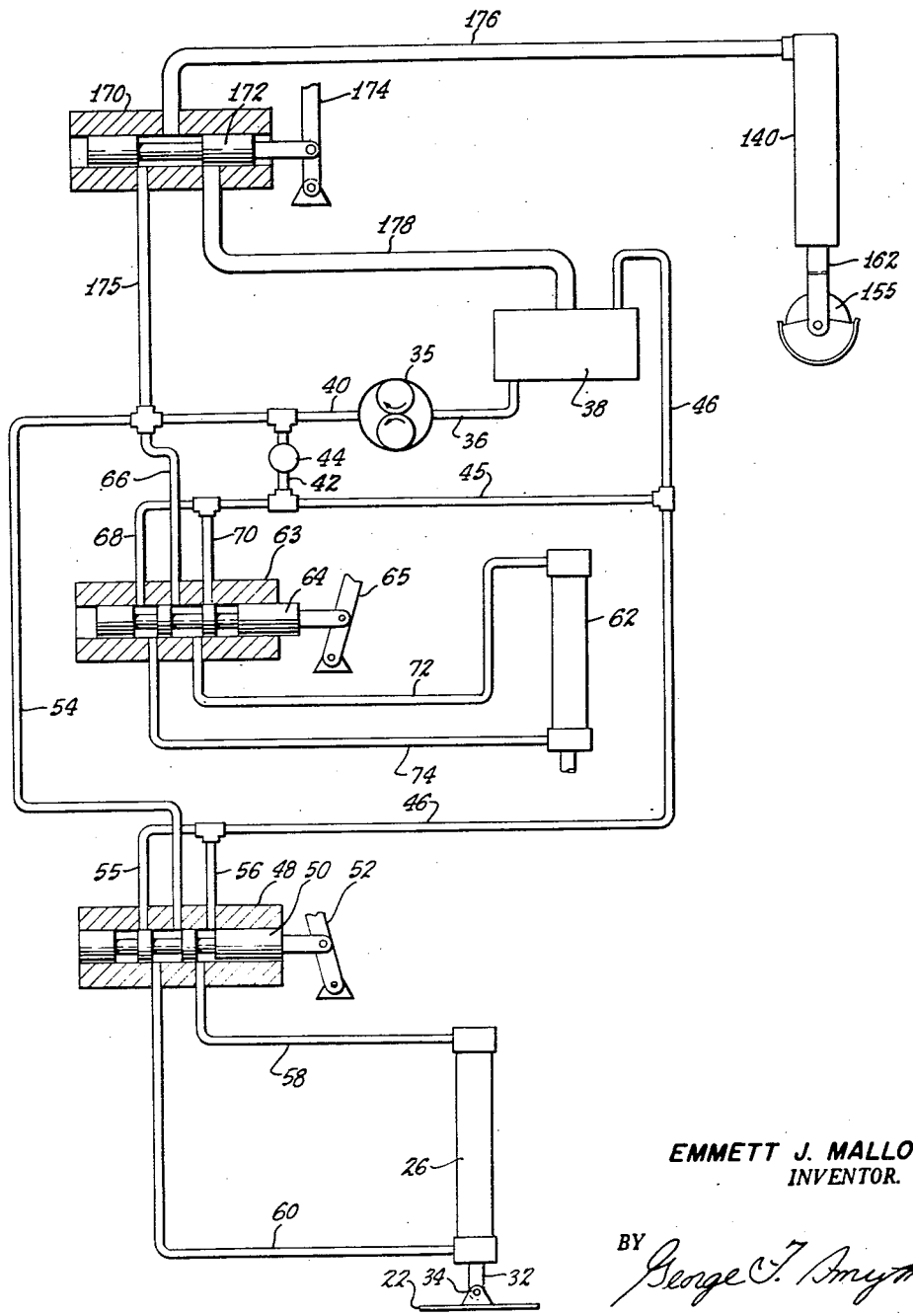
Figure 8 is a diagram of the hydraulic control system of the tractor as augmented by the present invention for the purpose of actuating the impact weight.

Figures 1 and 2 show a conventional tractor having two endless tracks 10 mounted on corresponding track frames 12. The chassis of the tractor carries the usual engine under a hood 14 and provides a rear platform 15 for the operator, this platform being flanked by flat fenders 16. The driver's seat 18 is reversible and in Figures 1 and 2 is shown turned towards the rear end of the tractor. The chassis is supported from the two track frames 12 by a plurality of transversely extending members including a square bar 20. The two ends of this bar protrude laterally from the two track frames 12.

The tractor carries a forward tool in the form of a pusher or bulldozer blade 22 that is mounted by a pivot 24 on a central longitudinal pusher bar 25. Fluid-actuated means in the form of a hydraulic power cylinder 26 is mounted at its rear end by a pivot 28 on a bracket 30 on the side of the tractor chassis. A piston rod 32 extends forward from the power cylinder and is connected by a pivot pin 34 with the bulldozer blade 22 so that extension and retraction of the piston causes the bulldozer blade to rock laterally about the central pivot 24 to various angles relative to the tractor. The pivotal connection 28 is sufficiently loose to permit the bulldozer blades to be raised or lowered.

The hydraulic control system of the tractor, which is shown diagrammatically in Figure 8, includes the usual pump 35 driven by the tractor engine. The pump 35 is connected by an intake pipe 36 with the usual reservoir 38 containing hydraulic fluid. The high pressure pipe 40 on the discharge side of the pump is connected to a by-pass pipe 42 which is provided with the usual relief valve 44. The by-pass pipe 42 is connected with a return pipe 45 which, in turn, is connected to the reservoir 38 by a main return pipe 46. The relief valve 44, which is spring loaded, is adjustable to open at a predetermined pressure to by-pass fluid from the high pressure pipe 36 to the reservoir 38 thereby to limit the fluid pressure on the discharge side of the pump.

The previously mentioned power cylinder 26 for varying the angle of the bulldozer blade 22 is controlled by a valve 48 having a spool-type valve member 50, this valve member being shiftable by a remote control lever 52 in a well known manner. The control valve 48 has a high pressure intake port that is connected by a pipe 54 to the previously mentioned high pressure pipe 40. The two discharge ports of the control valve are connected by pipes 55 and 56 to the previously mentioned main return pipe 46. The remaining two ports of the control valve are connected by pipes 58 and 60 respectively with the opposite ends of the hydraulic cylinder 26.

Figure 8 shows the valve member 50 of the control valve 48 positioned to cause retraction of the piston rod 32 by placing the high pressure pipe 54 in communication with the pipe 60 at one end of the hydraulic cylinder 26 with the pipe 58 at the other end of the cylinder in communication with the return line 46. At an alternate position of the valve member 50 these connections are reversed to admit high pressure fluid to the pipe 58 and to place the pipe 60 in communication with the return pipe 46 for extension of the piston rod 32.

The tractor also has the usual hydraulic power cylinder 62 for raising and lowering the bulldozer blade 22 in a well known manner. A second control valve 63 having a valve member 64 operated by a remote control lever 65 governs the operation of this second hydraulic cylinder 62 in the manner heretofore described. For this purpose, the high pressure intake port of the control valve 64 is connected by a pipe 66 with the previously mentioned high pressure line 40 and the two discharge ports of the control valve are connected by pipes 68 and 70 with the previously mentioned return pipe 45. The remaining two ports of the control valve 63 are connected to opposite ends of the hydraulic power cylinder 62 by pipes 72 and 74, respectively.

The structure described to this point is conventional and is original equipment of the usual tractor on which the present invention is mounted as an accessory.

In the presently preferred practice of the invention, the accessory includes what may be termed an auxiliary frame, generally designated F, which is mounted on the rear end of the tractor. This auxiliary frame includes two upright corner members 82 which are interconnected at their upper and lower ends by parallel frame members 84 and 85. These two parallel frame members serve as track members to carry a transversely shiftable carriage generally designated C. In this instance, the two track members 84 and 85 are in the form of I-beams.

The auxiliary frame further includes longitudinal base members 86 positioned to extend along the two sides of the tractor. These base members are connected to the upright corner members 82 by a diagonal brace member 87. The auxiliary frame F may further include inner diagonal braces 88 for connection by bolts 89 to a transverse traction bar 90 of the tractor (Figure 2).

In the present embodiment of the invention, each of the longitudinal base members 86 is removably connected to the corresponding track frame 12 of the tractor by a suitable bolt 91 and is connected to the corresponding end of the transverse square bar 20 by a pair of clamp members 92. The two clamp members 92 are removably interconnected by cap screws 94. It is apparent that the bolts 89 and 91 and the cap screws 94 may be loosened to remove the auxiliary frame F from the tractor whenever desired.

The carriage C includes two parallel upright channel members 95 which are turned towards each other to serve as a guide for an impact member in the form of a heavy weight W. The upper ends of the two channel members 95 are interconnected by a horizontal member 96, one end of which is extended to form a lateral overhanging arm 98 as shown in Figure 3. The impact weight W may comprise a heavy casting formed with two opposite guide wings 100 that ride in the upright guide channels 95.

The carriage C further includes an upper support yoke 102 and a lower support yoke 104. Each of the two support yokes 102 and 104 has a pair of arms 106 that are connected respectively to the two upright guide channels 95.

The two yokes 102 and 104 are adapted to ride along the two I-beam track members 84 and 85 respectively. In the construction shown, two parallel plates 108 mounted on the upper yoke 102 by bolts 110 extend downward therefrom on opposite sides of the upper I-beam track member 84. As best shown in Figures 4 and 5, each of these downward plates 108 carries a pair of inwardly extending spindles or axles 112 on which are mounted flanged wheels 114. These flanged wheels ride against the upper flanges of the I-beam track member 84. In like manner, the lower yoke 104 has a pair of downwardly extending plates 116 mounted thereon by bolts 118. These plates 116 have spindles 120 carrying flanged wheels 122 to ride on the lower flanges of the lower I-beam track member 85.

As heretofore stated, a feature of the present embodiment of the invention is the concept of operatively connecting the carriage C with a selected component of the hydraulic control system of the tractor whereby the operator may shift the carriage transversely on the auxiliary frame by means of an existing remote control on the tractor. It is apparent that for this purpose, the carriage may be operatively connected to any hydraulic power cylinder of the tractor control system. In this instance the carriage is connected with the bulldozer blade 22 to shift in response to actuation of the hydraulic power cylinder 26.

In the arrangement shown in the drawings, there are two cables 124 operatively connecting the carriage C with the bulldozer blade 22, one on each side of the tractor. One end of each of the cables 124 is connected by an eye-bolt 125 to an angular clip 126 on the corresponding base member 86 of the auxiliary frame F. The cable 124 extends forward from the eye-bolt to pass around a sheave 128 that is mounted on the end of the bulldozer blade 22 by a corresponding pivoted bracket 130. Each cable 124 extends forward from the corresponding sheave 128 through a tube 132 carried by the auxiliary frame F. At the forward end of the tube 132 the cable passes around an idler sheave 134 on the frame F and is connected to the carriage C by suitable attachment means.

It is apparent that when the hydraulic cylinder 26 is energized to thrust the piston rod 32 forward, as viewed in Figure 2, to change the angle of the bulldozer blade 22 relative to the tractor, the cable 124 on the right side of the tractor is pulled forward to cause the carriage C to move towards the right side of the tractor. Conversely, retraction of the piston rod 32 to rock the left end of the bulldozer blade forward pulls on the left cable 124 to shift the carriage C towards the left side of the tractor. By virtue of this arrangement, the operator may position the carriage C at any desired point along the auxiliary frame F by appropriate manipulation of the remote control lever 52.

The impact weight W may be lifted up along the upright guide channels 95 of the carriage C by any suitable arrangement. A feature of the present embodiment of the invention, is the concept of employing fluid-actuated means for this purpose that may be easily and conveniently connected to the existing hydraulic control system of the tractor for energization thereby. In the construction shown in the drawings, the fluid-actuated means of the accessory comprises a hydraulic ram 140 that is suspended from the arm 98 of the carriage C by a pin 142. The lower end of the hydraulic ram may be immobilized by a suitable bracket 144 made in two parts, the two parts being interconnected by bolts 145. A cable 146 having one end attached to the impact weight W and the other end attached to the carriage C is formed with at least one loop that may be extended by the hydraulic ram 140 to lift the impact weight.

In the construction shown, the cable 146 extends upward from the weight W and passes over an idler sheave 148. The idler sheave 148 is mounted in a bracket 150 on the upper member 96 of the carriage and is partially enclosed by a guard 152. The cable 146 is preferably formed into two loops for control by the hydraulic ram 140. For this purpose a pair of sheaves 154 is mounted on the overhanging arm 98 of the carriage and another pair of sheaves 155 is carried by the hydraulic ram 140. The upper pair of sheaves 154 is mounted in a bracket 156 on the overhanging arm 98 and is partially covered by a guard 158. The two lower sheaves 155, which are provided with a guard 159, are mounted on an axle 160 carried by the forked end of a piston rod 162 extending downward from the hydraulic ram.

The cable 146 extends from the idler sheave 148 over one of the upper sheaves 154 and then passes around one of the lower sheaves 155 to return to the second upper sheave. From the second upper sheave, the cable passes downward around the second lower sheave 155 and finally the end 164 of the cable is anchored to the hydraulic ram bracket 144 by suitable attachment means 165.

Figure 8 shows how auxiliary hydraulic structure may be included in the accessory for connection with the hydraulic control system of the tractor to energize and control the hydraulic ram 140. The hydraulic ram 140 is controlled by a three-way valve 170 having a spool-type valve member 172 governed by a remote control lever 174. This remote control lever 174 along with the remote control levers 52 and 65 is within convenient reach of the operator of the tractor as shown in Figure 1.

The valve member 170 has a high pressure intake port connected by a pipe or flexible conduit 175 to the previously mentioned high pressure supply pipe 40. A relatively large port of the valve is connected to a relatively large pipe or flexible conduit 176 that leads to the upper end of the hydraulic ram 140. A relatively large discharge port of the valve member connects with a relatively large discharge pipe or flexible conduit 178 that returns to the reservoir 38.

In the position of the remote control lever 174 shown in Figure 8, the valve member 172 cuts off the return pipe 178 and places the high pressure supply pipe 175 in communication with the pipe 176 to cause the piston rod 162 of the hydraulic ram to shift downwardly. At the alternate position of the remote control lever 174, the valve member 172 cuts off the high pressure supply pipe 175 and places the pipe 176 in communication with the return pipe 178 to permit upward retraction of the piston rod 162 in response to the fall of the impact weight W. The two pipes 176 and 178 are of relatively large capacity to avoid undue retardation of the gravitational downward movement of the weight.

A further feature of the invention is the mounting of a suitable impact tool on the lower end of the weight W in a removable manner. Such an arrangement permits the use of a plurality of impact tools interchangeably.

In the construction shown, what may be termed a tool holder 180 in the form of a suitable casting is mounted on the lower end of the weight W. As best shown in Figure 6, the tool holder 180 has a plurality of radial ears 182 and the weight W is formed with corresponding ears 184 to permit the tool holder to be attached to the weight by suitable bolts 185. The tool holder has a central vertical bore 186 to receive the shanks of the various tools interchangeably and has a threaded transverse bore 188 to receive a suitable retaining screw 190.

Figures 1 and 3 show what may be termed a tamping tool 192 releasably mounted in the tool holder 180. This tamping tool is a casting suitably shaped for tamping impact with the ground. As best shown in Figure 6, the upper end of the tamping tool 192 rests against the lower face of the tool holder 180 and has an upwardly extending shank 194 that fits into the vertical bore 186 of the tool holder. The shank 194 is suitably recessed to receive a retaining ball with half of the ball seating in the recess and the other half extending into the transverse bore 188 of the tool holder. The retaining screw 190 is normally tightened against the retaining ball 195 and is immobilized by a suitable lock nut 196. It is apparent that the tamping tool 192 may be removed whenever desired simply by loosening the retaining screw 190.

Figure 7 shows a second impact tool 200 which may be used interchangeably with the tamping tool 192. The second impact tool 200 may be in the form of a chisel for breaking cement. The impact tool 200 is formed with a flange or collar 202 to abut the lower face of the tool holder 180 and is formed with the usual upwardly extending shank 204, this shank having a recess 206 to seat the previously mentioned retaining ball 195.

The manner in which the invention may be operated for its purpose may be understood from the foregoing description. It is a simple matter to mount the auxiliary frame F on the rear end of the tractor whenever desired.

It is also a simple task to connect the carriage C to the bulldozer blade for actuation thereby and to connect the accessory hydraulic components to the hydraulic control system of the tractor.

With the seat 18 reversed, as shown in Figures 1 and 2, it is a simple matter for the operator of the tractor to manipulate the remote control levers 52 and 174. The remote control lever 174 is reciprocated for actuation of the hydraulic ram 140 to cause the weight W to rise and fall; and the remote control lever 52 is actuated to cause the carriage C to shift step-by-step across the auxiliary frame F. In this manner a tamping tool or a chisel tool may be applied to the surface under the tractor for the whole width of the tractor while the tractor is stationary. When the carriage C has traversed the width of the tractor, the tractor is advanced for repetition of the cycle. In this manner the tool carried by the impact weight W is effective over the full width of the path of the tractor.

Although the now preferred embodiment of the invention has been shown and described herein, it is to be understood that the invention is not to be limited thereto, for it is susceptible to changes in form and detail within the scope of the appended claims.

I claim:

1. An accessory for mounting on a tractor that has a forward tool and remote control means for varying the position of the forward tool relative to the tractor, said accessory comprising: an auxiliary frame for attachment to the tractor in position extending transversely of the tractor; a downwardly directed auxiliary tool on said auxiliary frame, said tool being movable on said frame for shift transversely of the tractor; means to actuate said auxiliary tool; and means to shift said auxiliary tool on said auxiliary frame in response to change in position of said forward tool relative to the tractor whereby the auxiliary tool may be shifted by manipulation of said remote control means.

2. An accessory as set forth in claim 1 which includes: transverse track means on said auxilary frame; a carriage for said auxiliary tool mounted on said track means; and means to operatively connect said carriage with said forward tool for movement of the carriage on the track means in response to change in position of the forward tool relative to the tractor.

3. A combination as set forth in claim 1 in which said shifting means includes a cable for connecting said forward tool with said auxiliary tool.

4. An auxiliary tool assembly for mounting on a tractor that has a forward tool and a hydraulic control system for varying the position of the forward tool relative to the tractor by remote control, said tool assembly comprising: an auxiliary frame for attachment to the tractor; an impact tool; means to guide said impact tool for up and down movement, said guide means being movably mounted on said auxiliary frame for shift thereon transversely of the tractor; means operatively connecting said guide means to said forward tool to cause shift of the guide means on said auxiliary frame in response to change in position of the forward tool relative to the tractor; and a hydraulic actuator for energization by said hydraulic system for actuating said auxiliary tool.

5. An accessory for mounting on a tractor that has a forward tool and a hydraulic control system including a reservoir, a pump, and fluid-actuating means for varying the position of said forward tool relative to the tractor by remote control, said accessory comprising: an auxiliary frame for attachment to the tractor; a carriage movably mounted on said auxiliary frame for shift thereon transversely of the tractor, said carriage having upright guide surfaces; means for operatively connecting said carriage with said forward tool for shift of the carriage in response to change in position of the forward tool relative to the tractor; impact means movably mounted on said carriage for guidance by said guide surfaces; fluid-actuated means on said carriage for energization by said pump to raise said impact means whereby the impact means may be raised and released for gravitational movement to exert downward impact force; and valve means to control energization of said last mentioned fluid-actuated means by said pump for actuation of said impact means by remote control.

6. A combination as set forth in claim 5 in which the fluid-actuated means on said carriage includes: a cable interconnecting said impact means and said carriage, said cable being formed into at least one loop; and hydraulically controlled sheave means to expand said loop thereby to raise said impact means.

7. A combination as set forth in claim 6 in which said valve means is a three-way control valve; and in which the fluid-actuated means on said carriage is connected to said control valve by a duct of relatively large cross section and said control valve is connected to said reservoir by a duct of relatively large cross section to permit rapid gravitational fall of said impact means.

8. A combination as set forth in claim 7 which includes a tool element detachably mounted on the underside of said impact means whereby a plurality of tools may be used interchangeably with the impact means.

9. An accessory for mounting on a tractor that has a forward tool, hydraulic means for varying the position of said forward tool relative to the tractor, a reservoir, a pump connected to said reservoir for actuating said hydraulic means, and valve means between said pump and said hydraulic means for remote control of the hydraulic means, said accessory comprising: an auxiliary frame for mounting on said tractor, said frame including track means extending transversely of the tractor; a carriage mounted on said track means for movement transversely of the tractor; impact means mounted on said carriage for up and down movement relative thereto; a cable interconnecting said impact means and said carriage, said cable being looped; sheave means in engagement with the cable loop; fluid-actuated means to shift said sheave means for elongating the cable loop thereby to raise said impact means on said carriage, whereby the impact means may be raised and released for gravitational movement to exert downward impact force; a three-way valve in communication with said pump, said reservoir and said fluid-actuated means for raising of said impact means by remote control; and means including a cable connecting said carriage with said forward tool whereby the carriage may be shifted laterally of the tractor by varying the position of said forward tool relative to the tractor by remote control.

10. An accessory for mounting on a tractor that has a forward tool, hydraulic means for varying the position of said tool relative to the tractor, a reservoir, a pump connected to said reservoir for actuating said hydraulic means, and valve means between said pump and said hydraulic means for remote control of the hydraulic means, said accessory comprising: an auxiliary frame for attachment to the tractor; said frame having track means extending transversely of the tractor; an upright carriage riding on said track means to permit the carriage to be shifted transversely of the tractor; upright guide means carried by said carriage in a position off-set from said track means; an impact member slidingly mounted on said guide means for movement up and down relative to said carriage; means including a cable to connect carriage with said forward tool for shift of the carriage along said track means in response to change in position of the forward tool relative to the tractor; a cable interconnecting said impact means and said carriage, said cable being looped at least once; sheave means engaging the loop of the cable; a hydraulic actuator to shift said sheave means for elongation of the cable loop to raise the impact means along said guide means, whereby the impact means may be raised and released for downward gravitational impact movement; a remote control for said impact means including a control valve connected to said hydraulic actuator, said pump and said reservoir; and an impact tool detachably mounted on said impact means, whereby a plurality of impact tools may be used interchangeably with the impact means.

References Cited in the file of this patent
UNITED STATES PATENTS

| | | |
|---|---|---|
| 1,195,344 | Feller et al. | Aug. 22, 1916 |
| 1,684,882 | Penote | Sept. 18, 1928 |
| 2,321,615 | Paulsen | June 15, 1943 |
| 2,659,583 | Dorkins | Nov. 17, 1953 |